(12) United States Patent
Matsumoto et al.

(10) Patent No.: US 12,184,436 B2
(45) Date of Patent: Dec. 31, 2024

(54) NETWORK CONTROL APPARATUS, NETWORK CONTROL METHOD, AND NETWORK CONTROL PROGRAM

(71) Applicant: NEC Communication Systems, Ltd., Tokyo (JP)

(72) Inventors: Akira Matsumoto, Tokyo (JP); Yuki Baba, Tokyo (JP); Katsuyuki Akizuki, Tokyo (JP); Yuji Harada, Tokyo (JP); Tetsuji Kawatsu, Tokyo (JP)

(73) Assignee: NEC Communication Systems, LTD., Tokyo (JP)

( * ) Notice: Subject to any disclaimer, the term of this patent is extended or adjusted under 35 U.S.C. 154(b) by 135 days.

(21) Appl. No.: 17/921,418

(22) PCT Filed: May 6, 2021

(86) PCT No.: PCT/JP2021/017344
§ 371 (c)(1),
(2) Date: Oct. 26, 2022

(87) PCT Pub. No.: WO2021/225134
PCT Pub. Date: Nov. 11, 2021

(65) Prior Publication Data
US 2023/0163983 A1    May 25, 2023

(30) Foreign Application Priority Data
May 7, 2020 (JP) .................. 2020-081718

(51) Int. Cl.
*H04L 12/12* (2006.01)
*H04L 12/40* (2006.01)

(52) U.S. Cl.
CPC ........ *H04L 12/12* (2013.01); *H04L 12/40039* (2013.01); *H04L 2012/40273* (2013.01)

(58) Field of Classification Search
CPC .............. H04L 12/12; H04L 12/40039; H04L 2012/40273; B60R 16/023
See application file for complete search history.

(56) References Cited

U.S. PATENT DOCUMENTS

| 10,755,567 B2* | 8/2020 | Kamini .................. H04W 4/80 |
| 2014/0047255 A1* | 2/2014 | Sasaki .................... H04L 12/40 |
| | | 713/323 |

(Continued)

FOREIGN PATENT DOCUMENTS

| CN | 105438062 A | 3/2016 |
| CN | 110494868 A | 11/2019 |

(Continued)

OTHER PUBLICATIONS

CN Office Action for CN Application No. 202180033461.7, mailed on Mar. 13, 2024 with English Translation.

(Continued)

*Primary Examiner* — Jay P Patel

(57) ABSTRACT

There is provided a network control apparatus that realizes an in-vehicle network with low power consumption. The network control apparatus comprises a vehicle state acquisition part that acquires the state of a vehicle; a control profile acquisition part that acquires a control profile, according to the acquired vehicle state, from one or more control profiles including settings for controlling equipment connected to an in-vehicle network; and a control part that controls equipment within the in-vehicle network on the basis of the acquired control profile.

9 Claims, 12 Drawing Sheets

(56) References Cited

U.S. PATENT DOCUMENTS

| | | |
|---|---|---|
| 2015/0025704 A1 | 1/2015 | Horibata et al. |
| 2015/0329004 A1* | 11/2015 | Sakai ................ B60L 53/16 |
| | | 701/22 |
| 2016/0300672 A1* | 10/2016 | Noguchi ............. B60R 16/023 |
| 2018/0097727 A1 | 4/2018 | Akiyoshi et al. |
| 2018/0131700 A1* | 5/2018 | Ando .................. H04L 63/162 |
| 2019/0193654 A1* | 6/2019 | Ohno ................. G07C 5/0841 |
| 2019/0279509 A1* | 9/2019 | Kamini ................. H04W 4/80 |
| 2020/0143670 A1 | 5/2020 | Kitani et al. |
| 2020/0220838 A1* | 7/2020 | Ogawa .................. H04L 12/28 |
| 2020/0271470 A1* | 8/2020 | Symanow ............ B60W 20/12 |
| 2022/0231997 A1* | 7/2022 | Yamamoto ............. H04L 63/08 |

FOREIGN PATENT DOCUMENTS

| | | |
|---|---|---|
| CN | 110550044 A | 12/2019 |
| CN | 110722947 A | 1/2020 |
| JP | 2009-278531 A | 11/2009 |
| JP | 2013-192108 A | 9/2013 |
| JP | 2014-080142 A | 5/2014 |
| JP | 2014-236492 A | 12/2014 |
| JP | 2015-107672 A | 6/2015 |
| JP | 2018-074204 A | 5/2018 |
| WO | 2016/157844 A1 | 10/2016 |
| WO | 2016/157845 A1 | 10/2016 |
| WO | 2016/157846 A1 | 10/2016 |
| WO | 2016/157847 A1 | 10/2016 |

OTHER PUBLICATIONS

International Search Report for PCT Application No. PCT/JP2021/017344, mailed on Jul. 20, 2021.

Extended European Search Report for EP Application No. 21800557.7, dated on Sep. 28, 2023.

* cited by examiner

FIG. 4

| CONTROLLED EQUIPMENT | SETTINGS |
|---|---|
| ECU #1 | STANDBY |
| ECU #2 | ACTIVE |
| ... | ... |
| COMMUNICATION PORT #1 | ACTIVE |
| COMMUNICATION PORT #2 | OFF |
| COMMUNICATION PORT #3 | STANDBY |
| ... | ... |
| WIRELESS MODULE #1 | ACTIVE |
| ... | ... |
| CAMERA #1 | OFF |
| ... | ... |
| SENSOR #1 | OFF |
| ... | ... |
| CENTRAL DOOR LOCK CONTROL UNIT | STANDBY |
| VIDEO DISPLAY UNIT | OFF |
| ... | ... |

FIG. 9

| VEHICLE STATE ID | OPERATION STATES | CONTROL PROFILE ID | DESCRIPTION |
|---|---|---|---|
| 0 | 1,2 | P0 | PARKED/LOCKED STATE |
| 1 | 0,2 | P1 | PARKED/UNLOCKED STATE |
| 2 | 0,1,4 | P2 | PARKED/ACC STATE |
| 3 | 2,4 | P3 | PARKED/ACC STATE/ ENTERTAINMENT SYSTEM ON |
| 4 | 3,2,5 | P4 | PARKED/IDLING |
| 5 | 4,6,9,12,15,18 | P5 | STOPPED/MOVABLE STATE |
| 6 | 5,7,8 | P6 | MANUAL/STRAIGHT DRIVING STATE |
| 7 | 5,6 | P7 | MANUAL DRIVING/RIGHT LEFT TURN STATE |
| 8 | 5,6 | P8 | MANUAL DRIVING/LEFT TURN STATE |
| 9 | 5,10,11 | P9 | MANUAL/REVERSE STRAIGHT DRIVING STATE |
| 10 | 5,9 | P10 | MANUAL DRIVING/ REVERSE RIGHT TURN STATE |
| 11 | 5,9 | P11 | MANUAL DRIVING/REVERSE LEFT TURN STATE |
| 12 | 5,13,14 | P12 | AUTONOMOUS/STRAIGHT DRIVING STATE |
| 13 | 5,12 | P13 | AUTONOMOUS/RIGHT TURN STATE |
| 14 | 5,12 | P14 | AUTONOMOUS/LEFT TURN STATE |
| 15 | 5,16,17 | P15 | AUTONOMOUS/ REVERSE STRAIGHT DRIVING STATE |
| 16 | 5,15 | P16 | AUTONOMOUS/ REVERSE RIGHT TURN DRIVING STATE |
| 17 | 5,15 | P17 | AUTONOMOUS/ REVERSE LEFT TURN DRIVING STATE |
| 18 | 5,19,20 | P18 | REMOTE/STRAIGHT DRIVING STATE |
| 19 | 5,18 | P19 | REMOTE DRIVING/RIGHT TURN STATE |
| 20 | 5,18 | P20 | REMOTE DRIVING/LEFT TURN STATE |
| ... | ... | ... | ... |

FIG. 12

| VEHICLE STATE ID | KEY POSITION | DOOR | GEAR | P BRAKE | BRAKES | SPEED | STEERING ANGLE | ENT/MT | DRIVING MODE | ... | TRANSITION DESTINATION | DESCRIPTION |
|---|---|---|---|---|---|---|---|---|---|---|---|---|
| 0 | OFF | LOKCED | P | ON | - | =0 | - | - | - | ... | 1,2 | PARKED/LOCKED STATE |
| 1 | OFF | UNLOCKED | P | ON | - | =0 | - | - | - | ... | 0,2 | PARKED/UNLOCKED STATE |
| 2 | ACC | - | P | ON | - | =0 | - | OFF | - | ... | 0,1,4 | PARKED/ACC STATE |
| 3 | ACC | - | P | ON | - | =0 | - | ON | - | ... | 2,4 | PARKED/ACC STATE/ ENT/MT SYSTEM ON |
| 4 | ON | - | P | ON | - | =0 | - | - | - | ... | 3,2,5 | PARKED/IDLING |
| 5 | ON | LOKCED | D or R | OFF | ON | =0 | - | - | - | ... | 4,6,9,12,15,18 | STOPPED/MOVABLE STATE |
| 6 | ON | LOKCED | D | OFF | - | >0 | ≦ 2° | - | MANUAL | ... | 5,7,8 | MANUAL/ STRAIGHT DRIVING STATE |
| 7 | ON | LOKCED | D | OFF | - | >0 | > 2° | - | MANUAL | ... | 5,6 | MANUAL DRIVING/ RIGHT TURN STATE |
| 8 | ON | LOKCED | D | OFF | - | >0 | < -2° | - | MANUAL | ... | 5,6 | MANUAL DRIVING/ LEFT TURN STATE |
| 9 | ON | LOKCED | R | OFF | - | <0 | ≦ 2° | - | MANUAL | ... | 5,10,11 | MANUAL/ REVERSE STRAIGHT DRIVING STATE |
| 10 | ON | LOKCED | R | OFF | - | <0 | > 2° | - | MANUAL | ... | 5,9 | MANUAL DRIVING/ REVERSE RIGHT TURN STATE |
| 11 | ON | LOKCED | R | OFF | - | <0 | < -2° | - | MANUAL | ... | 5,9 | MANUAL DRIVING/ REVERSE LEFT TURN STATE |
| 12 | ON | LOKCED | D | OFF | - | >0 | ≦ 2° | - | AUTONOMOUS | ... | 5,13,14 | AUTONOMOUS/ STRAIGHT DRIVING STATE |
| 13 | ON | LOKCED | D | OFF | - | >0 | > 2° | - | AUTONOMOUS | ... | 5,12 | AUTONOMOUS/ RIGHT TURN STATE |
| 14 | ON | LOKCED | D | OFF | - | >0 | < -2° | - | AUTONOMOUS | ... | 5,12 | AUTONOMOUS/LEFT TURN STATE |
| 15 | ON | LOKCED | R | OFF | - | <0 | ≦ 2° | - | AUTONOMOUS | ... | 5,16,17 | AUTONOMOUS/ REVERSE STRAIGHT DRIVING STATE |
| 16 | ON | LOKCED | R | OFF | - | <0 | > 2° | - | AUTONOMOUS | ... | 5,15 | AUTONOMOUS/ REVERSE RIGHT TURN DRIVING STATE |
| 17 | ON | LOKCED | R | OFF | - | <0 | < -2° | - | AUTONOMOUS | ... | 5,15 | AUTONOMOUS/ REVERSE LEFT TURN DRIVING STATE |
| 18 | ON | LOKCED | - | OFF | - | >0 | ≦ 2° | - | REMOTE | ... | 5,19,20 | REMOTE/ STRAIGHT DRIVING STATE |
| 19 | ON | LOKCED | - | OFF | - | >0 | > 2° | - | REMOTE | ... | 5,18 | REMOTE DRIVING/ RIGHT TURN STATE |
| 20 | ON | LOKCED | - | OFF | - | >0 | < -2° | - | REMOTE | ... | 5,18 | REMOTE DRIVING/ LEFT TURN STATE |
| : | : | : | : | : | : | : | : | : | : | ... | : | : |

NETWORK CONTROL APPARATUS, NETWORK CONTROL METHOD, AND NETWORK CONTROL PROGRAM

This application is a National Stage Entry of PCT/JP2021/017344 filed on May 6, 2021, which claims priority from Japanese Patent Application 2020-081718 filed on May 7, 2020, the contents of all of which are incorporated herein by reference, in their entirety.

FIELD

TECHNICAL FIELD

REFERENCE TO RELATED APPLICATION

The present invention is based upon and claims the benefit of the priority of Japanese patent application No. 2020-081718 filed on May 7, 2020, the disclosure of which is incorporated herein in its entirety by reference thereto.

The present apparatus, etc. relate to a technology for achieving power saving by controlling an in-vehicle network.

BACKGROUND

In recent years, vehicles that travel while acquiring information such as the conditions and the environment inside the car with sensors have become common. The acquired information is collected by an information processing apparatus such as an ECU (Electronic Control Unit) via an in-vehicle network. Meanwhile, whether a vehicle runs on electricity or gasoline, it is necessary to save energy as much as possible so as to increase the mileage. Therefore, it is desirable that an in-vehicle network operate with low power consumption.

Patent Literature 1 discloses a vehicle communication unit capable of reducing power consumption when not needed. More concretely, this unit collects vehicle information at a predetermined frequency while the vehicle is running and displays the information on a mobile device. When the vehicle is stopped, since it is less necessary to display the vehicle information compared with when it is running, an operation called a power saving mode is used to decrease the frequency of collecting the vehicle information and reduce the power consumption of the vehicle communication unit and the mobile device as compared with normal mode.

Patent Literature 2 discloses a node control apparatus in a network system based on Software-Defined Networking (SDN) technology. More concretely, this apparatus controls a communication interface provided to a port of each node in the network according to a physical layer mode indicated by the control apparatus. Patent Literature 2 states that the power consumption of the port can be adjusted by switching the mode.

[Patent Literature 1]
Japanese Patent Kokai Publication No. JP2018-074204A
[Patent Literature 2]
International Publication Number WO2016/157847A
[Patent Literature 3]
International Publication Number WO2016/157844A
[Patent Literature 4]
International Publication Number WO2016/157845A
[Patent Literature 5]
International Publication Number WO2016/157846A
[Patent Literature 6]
Japanese Patent Kokai Publication No. JP2014-236492A

SUMMARY

The disclosure of each Patent Literature cited above is incorporated herein in its entirety by reference thereto. The following analysis was made by the present inventors.

As described above, in order to reduce power used for a communication network, by turning off the power of a connection port of a network device (router or network switch) that controls a communication path or setting it to a power saving mode at specified time periods or according to network conditions such as traffic volume, it is possible to decrease the power required for the entire network.

However, since it is difficult to determine the timing of changing a normal state to a power saving state or restoring the normal mode from the power saving mode, there is a problem that power saving is insufficient as a result. Further, if devices connected to an in-vehicle network perform power saving asynchronously, each device transitions from a power saving state to a normal state asynchronously as well. As a result, when a device in a power saving state receives normal-state network traffic from a communication partner device in a normal state, it cannot process the data, causing a packet loss. Due to the fact that a vehicle is constantly moving, an in-vehicle network must be controlled instantly, and if a packet loss forces the data to be retransmitted, this leads to a delay in operation, causing a big problem.

Therefore, it is a main object of the present invention in one aspect to provide a network control apparatus that contributes to saving power of equipment connected to an in-vehicle network as an entire vehicle.

According to a first aspect of the present invention, there is provided a network control apparatus comprising a vehicle state acquisition part that acquires the state of a vehicle; a control profile acquisition part that acquires a control profile, according to the acquired vehicle state, from one or more control profiles including settings for controlling equipment connected to an in-vehicle network; and a control part that controls equipment within the in-vehicle network on the basis of the acquired control profile.

According to a second aspect of the present invention, there is provided a network control method comprising acquiring the state of a vehicle; acquiring a control profile, according to the acquired vehicle state, from one or more control profiles including settings for controlling equipment connected to the in-vehicle network; and controlling equipment within the in-vehicle network on the basis of the acquired control profile.

According to a third aspect of the present invention, there is provided a network control program for causing a computer to execute a process of acquiring the state of a vehicle; a process of acquiring a control profile, according to the acquired vehicle state, from one or more control profiles including settings for controlling equipment connected to the in-vehicle network; and a process of controlling equipment within the in-vehicle network on the basis of the acquired control profile.

Further, this program can be stored in a computer-readable storage medium. The storage medium may be a non-transient one such as a semiconductor memory, a hard disk, a magnetic recording medium, an optical recording medium, and the like. The present invention can also be realized as a computer program product.

According to each aspect of the present invention, there is provided a network control apparatus that contributes to saving power by acquiring the state inside a vehicle and controlling each piece of equipment connected to an in-vehicle network by applying the optimum settings (profile) thereto according to the acquired state.

BRIEF DESCRIPTION OF THE DRAWINGS

FIG. 4 is a drawing for explaining the content of an example of a control profile of the network control apparatus according to the first example embodiment.

FIG. 9 shows an example of a vehicle state transition information table in the network control apparatus according to the third example embodiment.

FIG. 12 shows another example of the vehicle state transition information table in the network control apparatus according to the third example embodiment.

EXAMPLE EMBODIMENT

Figure 1:
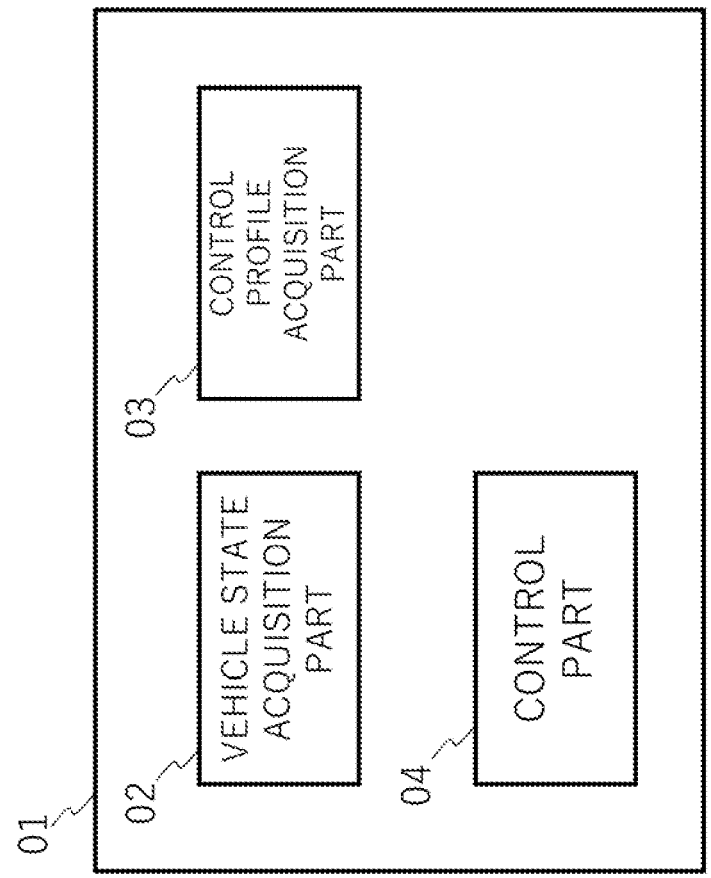
FIG. 1 is a block diagram showing an example of a network control apparatus according to an example embodiment.

First, an outline of an example embodiment will be given. It should be noted that the drawing reference signs in the outline are given to each element for convenience as an example to facilitate understanding, and the description in this outline is not intended to be any limitation.

A network control apparatus 01 according to an example embodiment has a vehicle state acquisition part 02 that acquires the state of a vehicle; a control profile acquisition part 03 that acquires a control profile, according to the acquired vehicle state, from one or more control profiles including settings for controlling equipment connected to the in-vehicle network; and a control part 04 that controls equipment within the in-vehicle network on the basis of the acquired control profile.

The network control apparatus 01 according to an example embodiment contributes to saving power in the entire network by distributing to each network device a control profile, which is network control content specified in advance to achieve power saving using not only information related to the in-vehicle network, but also information related to the state of the vehicle, and applying the control profile to each network device.

Specific example embodiments will be described below in more detail with reference to the drawings. Note that the same reference signs are given to the same elements in each example embodiment, and the description thereof will be omitted.

First Example Embodiment

Figure 2:
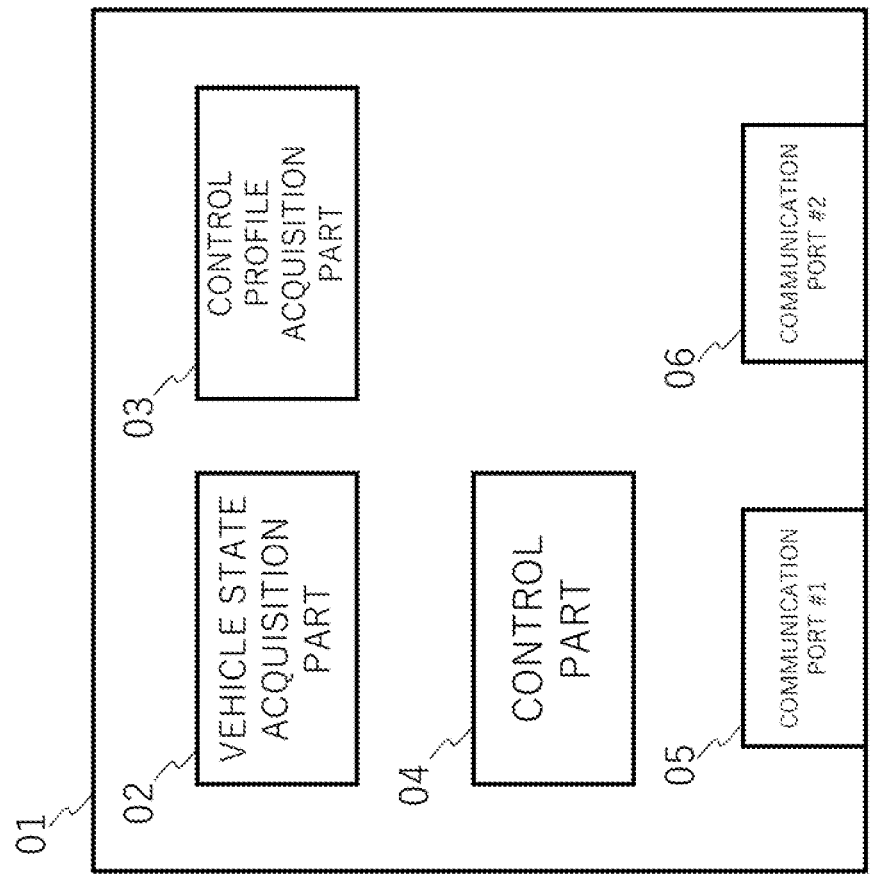
FIG. 2 is a block diagram showing an example of a network control apparatus according to a first example embodiment.

FIG. 2 is a drawing showing an outline of the configuration of the network control apparatus 01 according to the present example embodiment. As shown in the drawing, the network control apparatus has the vehicle state acquisition part 02, the control profile acquisition part 03, the control part 04, a communication port #1 05, and a communication port #2 06.

Figure 3:
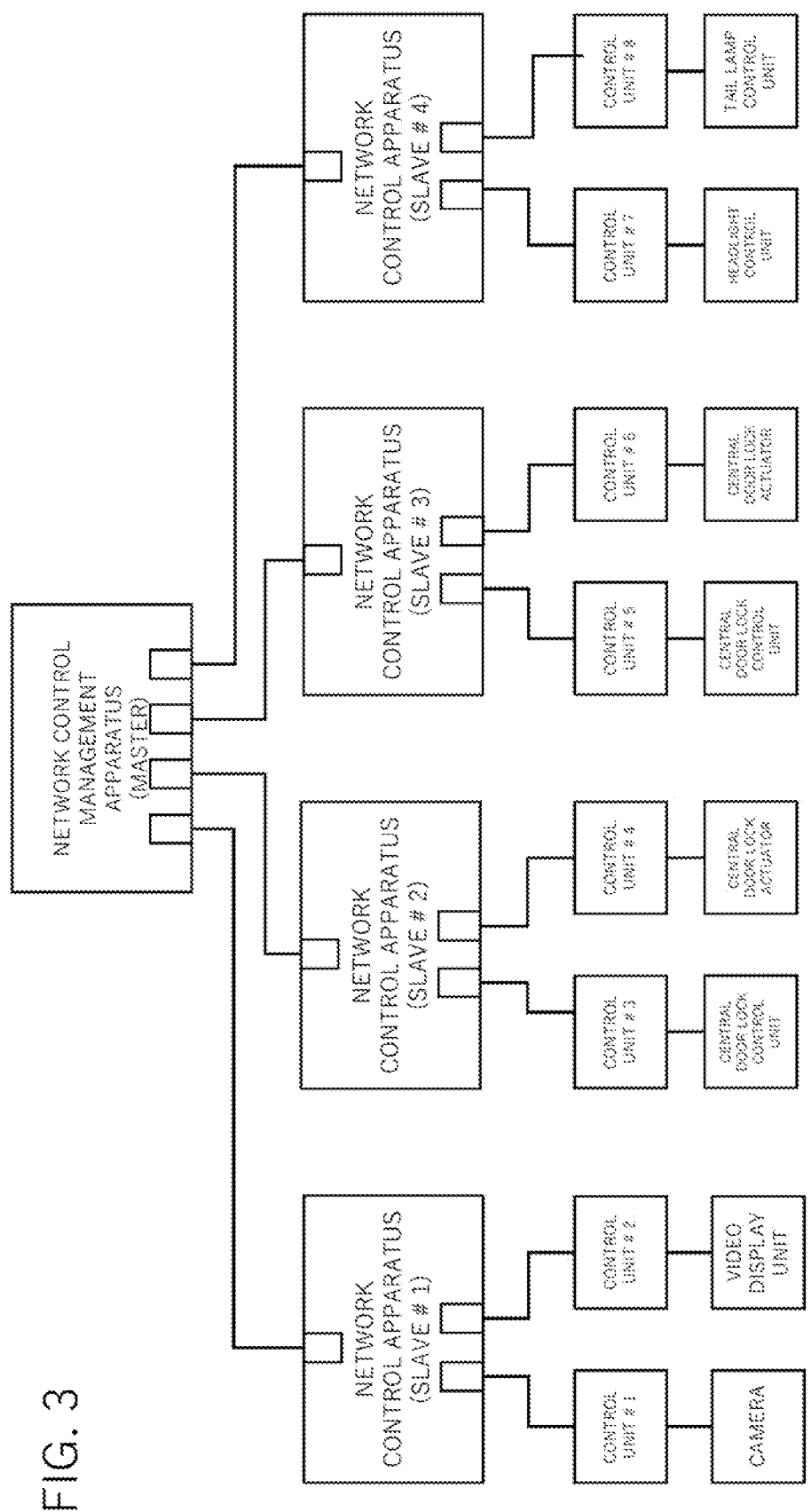
FIG. 3 is a block diagram illustrating a configuration example of the network control apparatus according to the first example embodiment.

Further, as shown in FIG. 3, a plurality of the network control apparatuses 01, operating in cooperation, may be provided in a vehicle. One may adopt a configuration in which the apparatuses are configured more or less identically and there is a master/slave relationship between the apparatuses with a master network control management apparatus managing slave apparatuses provided.

[Vehicle State Acquisition Part]

The vehicle state acquisition part 02 acquires the state of a vehicle. The term "vehicle" generally refers to an automobile, however, the present apparatus can be applied to an object that moves autonomously such as a ship and railway vehicle without being limited thereto. A "vehicle state" denotes a state that can be grasped from information that can be acquired from driving-related equipment (engines, tires, steering, brakes, transmissions, etc.) and additional equipment (doors, tailgates, windscreen wipers, seats, air conditioners, power windows, audio equipment, meter panels, information terminals, etc.) in the vehicle, information that can be acquired from a control system for controlling these pieces of equipment, information that can be acquired from sensors attached thereto, and information (routers, switches, etc.) related to an in-vehicle network to which these pieces of equipment are connected. State parameters include engine revolutions per minute, speed, steering angle, whether or not the brakes are used, gear stage, whether a door/tailgate is open or closed, whether or not the wipers are operating, the angle of a seat back, air conditioning air volume, whether a window is open or closed, the source of audio, the type of information displayed on the meter panel or an information terminal, and the power consumption or operating mode (low power consumption mode, standby mode, etc.) of equipment. These parameters are collected via the in-vehicle network and outputted to the control profile acquisition part 03.

[Control Profile Acquisition Part]

The control profile acquisition part 03 acquires a control profile, according to the acquired vehicle state, from one or more control profiles including settings for controlling equipment connected to the in-vehicle network. The "control profile" is a comprehensive list that includes settings for each piece of equipment as described above and it may be selected from one or more profiles generated in advance and stored in a storage area or may be newly generated on the spot according to the vehicle state. Alternatively, a control profile may be generated by partially modifying an existing profile as a base according to the vehicle state. The profile may include the settings for an entire piece of equipment or may be a partial profile describing the settings for a part of equipment.

FIG. 4 is a drawing for explaining the content of an example of the control profile. As shown in the drawing, each piece of controlled equipment is listed in association with its setting. FIG. 4 shows an example of the control profile applied to a state in which the vehicle is stopped and the driver is outside the car. For instance, a wireless module #1 is active for a keyless entry function to stand by and a central door lock control unit is in a low-power consumption standby state. Out of a plurality of ECUs, an ECU #1 that controls the central door lock control unit is in a standby state, and an ECU #2 is active. This is because the ECU #2 controls the wireless module#1 and needs to be active waiting for radio waves from the key. When radio waves from the key arrive at the wireless module #1 via an antenna, the ECU #2 sends a trigger to the ECU #1, which then becomes active. The ECU #1 activates the central door lock control unit from the standby state by transmitting a trigger thereto. The central door lock control unit sends a signal to an actuator to open or close the door lock. Further, with respect to communication ports, the communication port #1 on the path between the ECU #2 and the ECU #1 is set to be active. Other unnecessary ECUs, communication ports, cameras, sensors, video display units, etc., are turned off in order to reduce power consumption.

The control profile optimizes the power consumption of each piece of equipment to achieve power saving. For instance, the optimization may be achieved by maintaining the functions required for an assumed vehicle state and minimizing the total power consumption of the equipment.

The control profile described above lists the settings related to power saving for each piece of equipment, however, the control profile acquisition part 03 may acquire a control profile grouping a plurality of pieces of equipment and the control part 04 may control equipment on a group basis. For instance, it is possible to collectively control equipment required for driving at night such as headlights, tail lamps, interior lights, and the control units thereof by grouping them, turning the group off during daytime driving, and changing the state thereof from the off state to a standby state and then to an active state according to a value measured by an illuminance sensor. Further, the group may be activated in a mountainous area where lights are often needed in tunnels and deactivated in urban areas. Therefore, it is possible to precisely control the power consumption of each group according to the road environment, reducing the power consumption as a result. In addition, by having grouped equipment close to each other in terms of the network topology and having them use common switches and communication ports, it becomes possible to deactivate the network devices such as the switches and the communication ports when a group of connected equipment is in hibernation, further decreasing the power consumption.

[Control Part]

The control part 04 controls equipment within the in-vehicle network on the basis of the acquired control profile. More concretely, the control part 04 reads a control profile such as the one described above and controls equipment, applying the written settings thereto. The control part 04 may directly transmit a control signal to a piece of equipment or indirectly control it via a control unit or an ECU. Further, from the vehicle state acquisition part 02, the control part 04 is able to obtain feedback on the result of executing control and further execute control on the basis of this feedback.

The control part 04 has the communication port #1 05 and the communication port #2 06, described later, and communication transfer between communication ports, communication interruption, leasing and releasing of a network address required for communication, etc., are possible under the control of the control part 04. The control profile may also include settings for such control.

[Communication Port]

The communication port #1 05 and the communication port #2 06 communicate with other apparatuses and devices. A port in the present disclosure refers to a so-called input/output port and denotes a terminal of a network interface. Although the network control apparatus 01 in the first example embodiment has two communication ports, the number of communication ports is not particularly limited to two and any number of ports may be provided.

As described above, in the network control apparatus 01 in the present disclosure, the control part 04 controls the communication ports. Generally speaking, the power consumption of communication ports increases as more ports are used. Therefore, it is possible to save power by creating a control profile optimized for a communication path that uses as few communication ports as possible.

Further, the power consumption of a communication port generally changes according to a communication mode that sets the communicable band (for instance, 10 Mbps, 100 Mbps, 1000 Mbps), and the wider the communication band, the more power is consumed by the communication port. Therefore, it is possible to reduce power consumption by setting a communicable band according to the traffic in the in-vehicle network. In other words, power can be saved by putting a communication port on a path where no communication occurs in a standby state or in an off state in which no current flows in the circuit.

As described above, it is possible to save power further by taking into consideration the fact that the power consumption of a communication port changes according to how the communication band is set. For instance, the power consumption of the entire vehicle can be minimized by using a control profile that corresponds to a path with traffic distributed across a plurality of slow-speed ports, rather than a path with traffic concentrated on a single high-speed communication port.

[Processing Flow]

Figure 5:
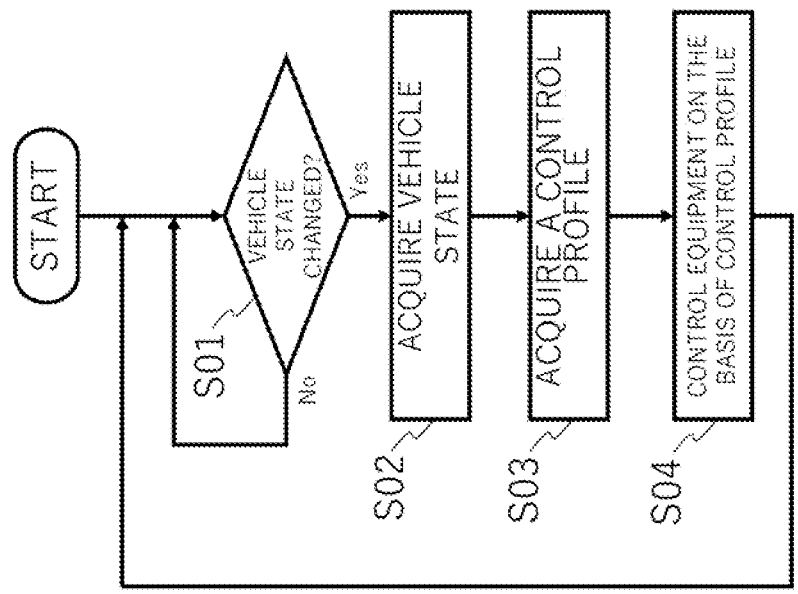
FIG. 5 is a flowchart showing a flow of processing performed by the network control apparatus according to the first example embodiment.

FIG. 5 is a flowchart showing a flow of processing performed by the network control apparatus according to the present example embodiment. As shown in the drawing, the apparatus first determines whether or not the state of the vehicle has changed (step S01). When determining that the vehicle state has changed, the apparatus acquires the state of the vehicle (step S02). Then, according to the acquired vehicle state, the apparatus acquires a control profile from one or more control profiles including settings for controlling equipment connected to the in-vehicle network (step S03). The apparatus controls equipment within the in-vehicle network on the basis of the acquired profile (step S04) and returns again to determining whether or not the state of the vehicle has changed (the step S01).

[Hardware Configuration]

Figure 6:
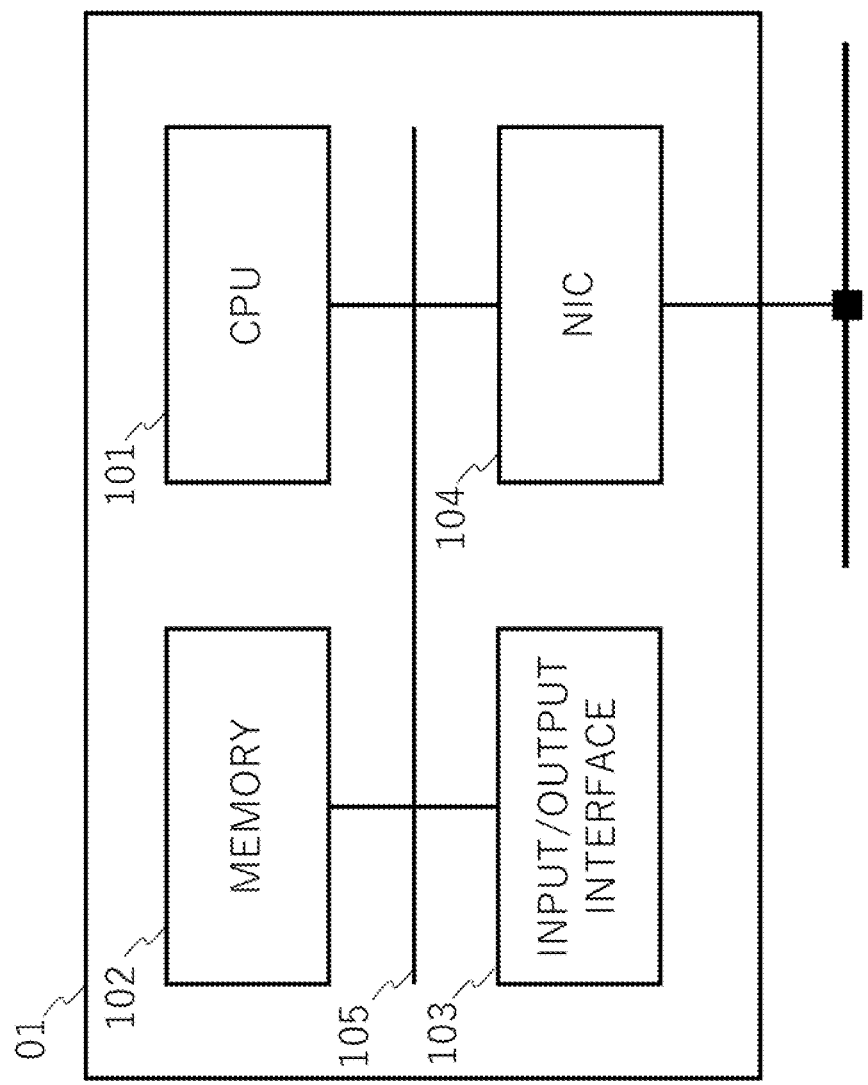
FIG. 6 is a block diagram showing an example of the hardware configuration of the network control apparatus according to the first example embodiment.

Next, the hardware configuration of the network control apparatus relating to the first example embodiment will be described. FIG. 6 is a block diagram showing an example of the hardware configuration of the network control apparatus 01 relating to the first example embodiment.

The network control apparatus 01 can be constituted by an information processing apparatus (computer) that comprises the configuration illustrated in FIG. 6. For instance, the network control apparatus 01 comprises a CPU (Central Processing Unit) 101, a memory 102, an input/output interface 103, and a NIC (Network Interface Card) 104, which is communication means. These elements are interconnected by an internal bus 105. The NIC has a communication port.

It should be noted that the configuration shown in FIG. 6 is not intended to limit the hardware configuration of the network control apparatus 01. The network control apparatus 01 may include hardware not shown in the drawing or dispense with the input/output interface 103, depending on the necessity. Further, the example of FIG. 6 does not limit the number of CPUs, etc., included in the network control apparatus 01, and for instance, a plurality of CPUs may be included in the network control apparatus 01.

The memory 102 is a RAM (Random Access Memory), ROM (Read-Only Memory), or auxiliary storage device (such as a hard disk).

The input/output interface 103 is means for interfacing a display device or an input device not shown in the drawing. For instance, the display device is a liquid crystal display. The input device is, for instance, a device that accepts user operations such as a touch panel display.

The functions of the network control apparatus 01 are realized by the hardware described above and processing modules such as a vehicle state acquisition program, a control profile acquisition program, and a control program. These processing modules are realized by having the CPU 101 execute, for instance, the vehicle state acquisition program stored in the memory 102. Further, this program may be downloaded via a network or updated using a storage medium storing the program. In addition, the processing modules may be realized by a semiconductor chip. In other words, means for executing the functions performed by the processing modules using some kind of hardware and software may be provided.

When the network control apparatus starts to operate, each of the programs described above is called from the memory 102 and is executed by the CPU 101. The priority of each program, thread, and process is optimized, and it is possible to reduce power consumption by lowering the priority of unused programs thereby reducing the CPU usage.

Here, when a hardware interrupt that changes the vehicle state (for instance, door opening or closing detected by a sensor) occurs, the vehicle state acquisition program in a standby state is executed by the CPU 101. The program acquires the state of equipment in the vehicle via the in-vehicle network. The acquired state in the vehicle is temporarily stored in the memory 102. Next, the control profile acquisition program is called from the memory 102 and executed. The program reads the state in the vehicle temporarily stored in the memory 102 and then acquires a control profile corresponding to the state in the vehicle by selecting or generating it. If a plurality of control profiles are acquired as a result, the program calculates the total power consumption of each profile and hands the profile with the lowest power consumption to the control program. The control program reads the settings for each piece of equipment written in the profile and transmits control information corresponding to the settings via the NIC 104.

[Effects]

As described, according to the network control apparatus of the first example embodiment, it is possible to achieve power saving for an entire vehicle by selecting a control profile optimized for the state of a vehicle and applying the selected control profile to equipment connected to an in-vehicle network.

Second Example Embodiment

Figure 7:
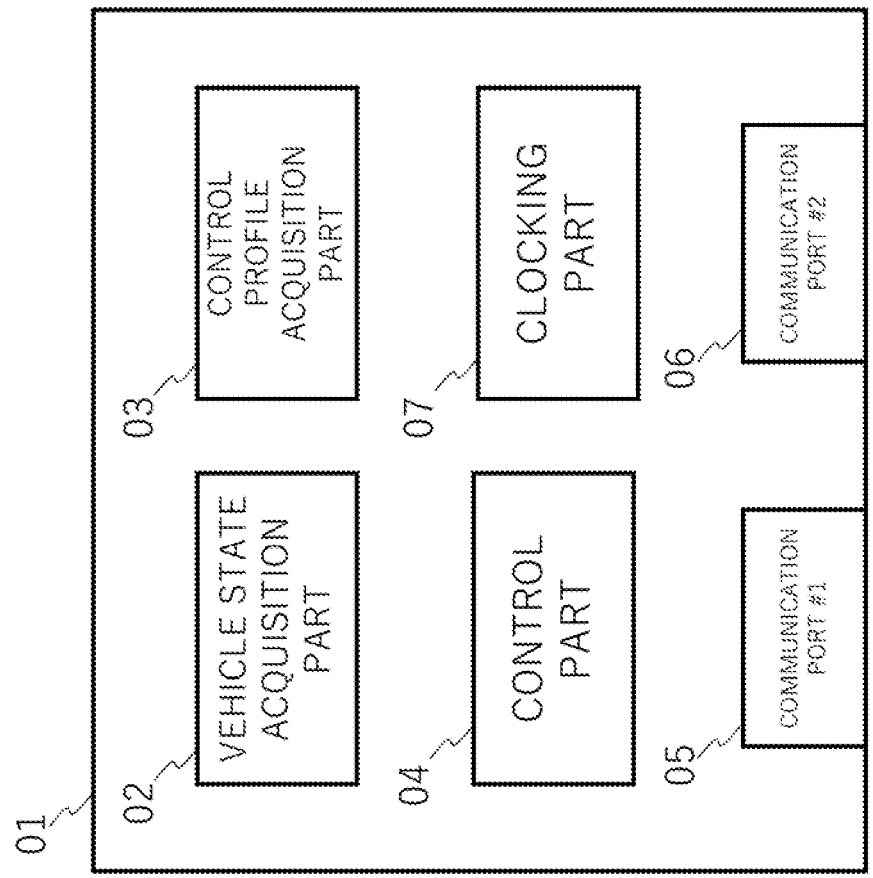
FIG. 7 is a block diagram for explaining the functions of a network control apparatus according to a second example embodiment.

FIG. 7 is a block diagram for explaining the functions of the network control apparatus 01 according to a second example embodiment. As shown in the drawing, the network control apparatus 01 has the vehicle state acquisition part 02, the control profile acquisition part 03, the control part 04, the communication port #1 05, and the communication port #2 06. Since these elements have already been explained above, the description thereof will be omitted. The network control apparatus 01 of the present example embodiment is characterized by having a clocking part 07 that outputs a signal at a constant cycle.

[Clocking Part]

The clocking part 07 outputs a clock signal having a constant cycle to the control part 04. Further, the clocking part 07 may output a clock signal to each piece of equipment connected to the in-vehicle network and the control device/control unit that controls it. More concretely, the clocking part 07 may transmit a signal by various means such as NTP (Network Time Protocol), IEEE 802.1AS, IEEE 802.1AServ, and broadcast notification. By having the clocking part 07 transmit such a signal, it becomes possible for each piece of equipment to operate synchronously according to the signal.

As for the method for transmitting a signal, the clocking part 07 may constantly transmit a synchronization signal with each piece of equipment operating according to the received signal. Alternatively, each piece of equipment may have a timer, and the clock of each equipment timer may be adjusted at regular intervals.

When each piece of equipment can operate synchronously, it is possible to align the timing of restoring a normal active state from a low-power consumption standby state. If pieces of equipment are out of sync and operating separately, a situation occurs in which a device A returns to an active state and sends a signal to a device B, which is still in a standby state when receiving the signal due to the fact that the device B does not return to an active state from a standby state synchronously with the device A, and consequently the signal does not reach the device B. In this case, a packet loss will occur in an in-vehicle network in which a signal may be transmitted as a packet, and the signal must be retransmitted.

[Effects]

Due to the fact that a vehicle is a moving object with the surrounding environment constantly changing, an in-vehicle network must be controlled instantly. Therefore, a time lag caused by retransmission may have a significant effect on the control result. According to the network control apparatus 01 of the present example embodiment, the timing of restoring an active state from a standby state can be synchronized, making it possible to execute control without any trouble.

Third Example Embodiment

Figure 8:
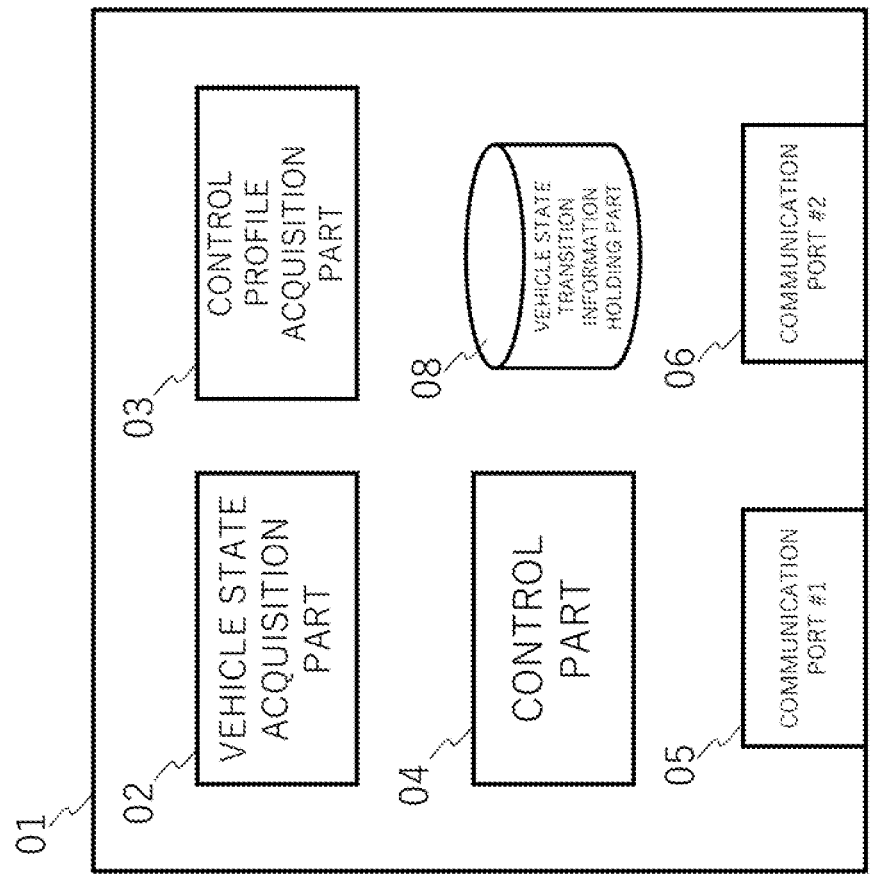
FIG. 8 is a block diagram for explaining the functions of a network control apparatus according to a third example embodiment.

FIG. 8 is a block diagram for explaining the functions of the network control apparatus 01 according to a third example embodiment. As shown in the drawing, the network control apparatus 01 has the vehicle state acquisition part 02, the control profile acquisition part 03, the control part 04, the communication port #1 05, and the communication port #2 06. Since these elements have already been explained above, the description thereof will be omitted. The network control apparatus of the present example embodiment is characterized by having a vehicle state transition information holding part 08 that states a current vehicle state and a state to which the current vehicle state may transition in the future and by having the control profile acquisition part 03 control the in-vehicle network on the basis of vehicle state transition information held by the vehicle state transition information holding part 08, in addition to a vehicle state acquired by the vehicle state acquisition part 02.

[Vehicle State Transition Information Holding Part]

The vehicle state transition information holding part 08 states a vehicle state and another vehicle state to which the vehicle state may transition in the future. A "vehicle state" refers to the state of a vehicle acquired by the vehicle state acquisition part 02. FIG. 9 is a table showing an example of the vehicle state transition information. As shown in the drawing, a vehicle state ID, a transition destination state ID, and a control profile ID are stored in association with each other. For instance, vehicle state ID 1 refers to a parked and unlocked state as indicated in the description. A control profile ID applied at this time is specified as P1. This state may transition to vehicle state ID 2 (parked/ACC state) or vehicle state ID 0 (parked/locked state).

[Control Profile Acquisition Part]

The control profile acquisition part 03 of the network control apparatus 01 according to the present example embodiment is able to apply a control profile according to a next transition destination state by acquiring a control profile using such vehicle state transition information. For instance, in FIG. 9, since it is known that the vehicle state ID 1 will transition to the vehicle state ID 2, it is possible to control equipment in advance anticipating an ACC state. Concretely, since in-vehicle information terminals may turn on in an ACC state, by activating control units and ECUs controlling the in-vehicle information terminals in advance, the operation can be started without delay when the state transitions to the vehicle state ID 2.

[Processing Flow]

Figure 10:
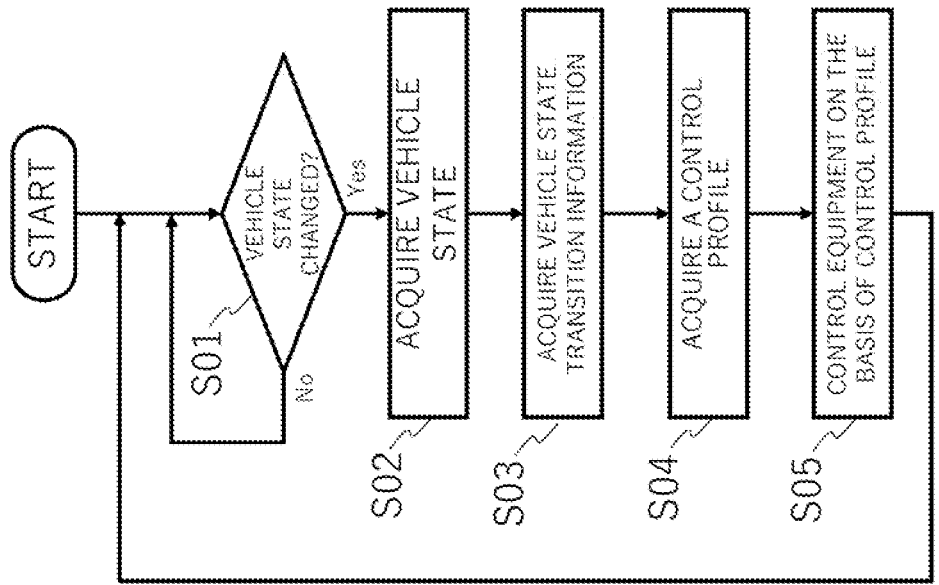
FIG. 10 is a flowchart showing a flow of processing performed by the network control apparatus according to the third example embodiment.

FIG. 10 is a flowchart showing a flow of processing performed by the network control apparatus according to the present example embodiment. As shown in the drawing, the apparatus first determines whether or not the state of the vehicle has changed (the step S01). When determining that the vehicle state has changed, the apparatus acquires the state of the vehicle (the step S02). Next, the apparatus acquires the vehicle state transition information (step S03). Then, according to the acquired vehicle state, the apparatus acquires a control profile from one or more control profiles including settings for controlling equipment connected to the in-vehicle network (step S04). At this time, the apparatus may derive settings of the minimum required power consumption for a next state to which the current state ID may transition. The apparatus controls equipment within the in-vehicle network on the basis of the acquired profile (step S05) and returns again to determining whether or not the state of the vehicle has changed (the step S01).

[Hardware Configuration]

Figure 11:
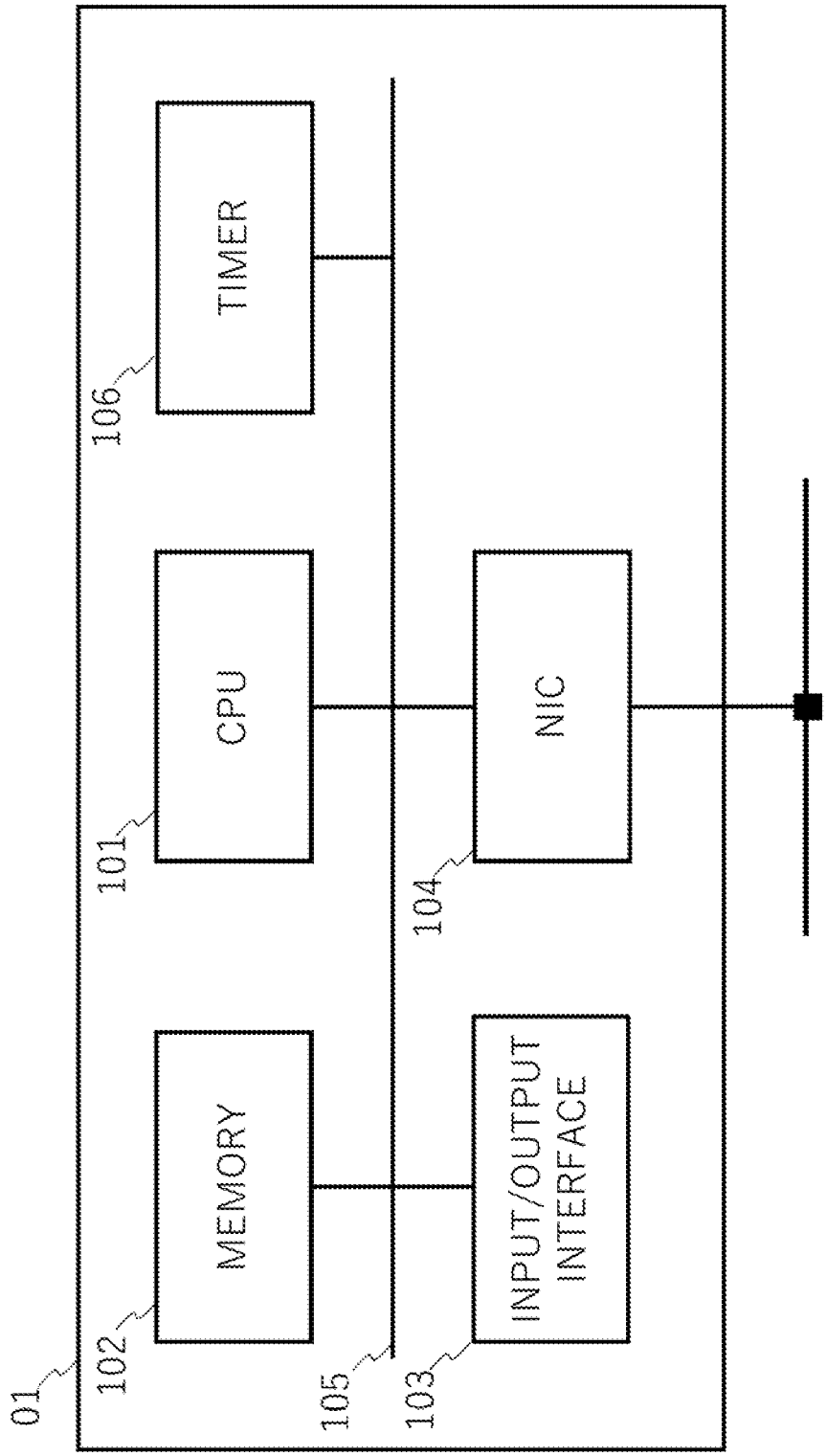
FIG. 11 is a block diagram showing an example of the hardware configuration of the network control apparatus according to the third example embodiment.

Next, the hardware configuration of the network control apparatus relating to the third example embodiment will be described. FIG. 11 is a block diagram showing an example of the hardware configuration of the network control apparatus 01 relating to the third example embodiment.

The network control apparatus 01 of the present example embodiment can be constituted by an information processing apparatus (computer) that comprises the configuration illustrated in FIG. 11. For instance, the network control apparatus 01 comprises the CPU 101, the memory 102, the input/output interface 103, and the NIC (Network Interface Card) 104, which is communication means. These elements are interconnected by the internal bus 105. The NIC has a communication port.

Further, the network control apparatus 01 of the present example embodiment may have a timer 106.

It should be noted that the configuration shown in FIG. 11 is not intended to limit the hardware configuration of the network control apparatus 01. The network control apparatus 01 may include hardware not shown in the drawing or dispense with the input/output interface 103, depending on the necessity. Further, the example of FIG. 11 does not limit the number of CPUs, etc., included in the network control apparatus 01, and for instance, a plurality of CPUs may be included in the network control apparatus 01.

The memory 102 is a RAM (Random Access Memory), ROM (Read-Only Memory), or auxiliary storage device (such as a hard disk).

The input/output interface 103 is means for interfacing a display device or an input device not shown in the drawing. For instance, the display device is a liquid crystal display. The input device is, for instance, a device that accepts user operations such as a keyboard or mouse.

The functions of the network control apparatus 01 are realized by the hardware described above and processing modules such as the vehicle state acquisition program, the control profile acquisition program, and the control program. These processing modules are realized by having the CPU 101 execute, for instance, the vehicle state acquisition program stored in the memory 102. Further, this program may be downloaded via a network or updated using a storage medium storing the program. In addition, the processing modules may be realized by a semiconductor chip. In other words, means for executing the functions performed by the processing modules using some kind of hardware and software may be provided.

Here, when a signal from the timer 106 causes a hardware interrupt, the vehicle state acquisition program in a standby state is executed by the CPU 101. The program acquires the state of equipment in the vehicle via the in-vehicle network. The acquired vehicle state is temporarily stored in the memory 102. Next, the control profile acquisition program is called from the memory 102 and executed. The program reads the vehicle state temporarily stored in the memory 102. Then, the program reads the vehicle state transition information table held in the memory 102. FIG. 12 shows another example of the vehicle state transition information table. CPU 101 searches for the corresponding state in the table using the acquired vehicle state. When the corresponding entry is found in the table, a transition destination state ID is acquired by referring to the corresponding entry. The vehicle state relating to the acquired transition destination state ID is read by referring to the table. The program causes the CPU 101 to derive a control profile on the basis of the current vehicle state read from the memory 102 and the transition destination vehicle state read from the table. More concretely, the program derives the optimum control profile according to the current vehicle state, and while referring to this control profile and a control profile corresponding to the transition destination vehicle state, the program changes the currently applied control profile so as to be able to deal with the transition destination vehicle state more smoothly.

With reference to FIG. 12, for instance, when the vehicle is parked and idling, the state ID is 4. FIG. 9 indicates that the control profile applied to this state is P4. As for transition destinations, potential transition destination state IDs are 3, 2, and 5. Here, if we assume that the state transitions to the vehicle state 5, which is a stopped/movable state, the control profile P5 is applied. Since P5 releases the handbrake, the device that controls the handbrake is activated in advance. Further, because the gear is changed to D (forward) or R (reverse) mode, the devices that control the headlights and the lamps turned on when the car is in reverse are activated in advance in preparation for turning on these lamps. A control profile is newly generated by adding these control items to the control profile P4.

The control profile acquired as described is sent via the NIC 104 and the in-vehicle network, and the control content thereof is applied to each piece of equipment. The control content may be applied at a timing according to an interrupt of the timer 106.

[Effects]

According to the network control apparatus of the present example embodiment, since it is possible to perform control, considering, in addition to the current vehicle state, a next vehicle state to which the current vehicle state transitions, the state of the vehicle can be transitioned smoothly. Further, since the operation of equipment can be scheduled, it is possible to perform detailed control and operate a required device only when needed, achieving comprehensive power saving.

Some or all of the example embodiments above can be described as (but not limited to) the following modes.

[Mode 1]

As the apparatus relating to the first aspect.

[Mode 2]

The network control apparatus preferably according to Mode 1, wherein the vehicle state acquisition part further acquires the power consumption of each piece of equipment connected to the in-vehicle network, and the control profile acquisition part further acquires a control profile on the basis of the sum of the acquired power consumption of each piece of the equipment.

[Mode 3]

The network control apparatus preferably according to Mode 1 or 2, wherein the control profile acquisition part further acquires a control profile grouping equipment connected to the in-vehicle network, and the control part controls each group on the basis of the control profile grouping equipment.

[Mode 4]

The network control apparatus preferably according to any one of Modes 1 to 3, wherein the vehicle state acquisition part further acquires the state of a communication port of equipment connected to the in-vehicle network, the control profile acquisition part further acquires a control profile on the basis of the acquired communication port state, and the control part further controls a communication port of equipment connected to the in-vehicle network on the basis of the acquired control profile.

[Mode 5]

The network control apparatus preferably according to any one of Modes 1 to 4, wherein the vehicle state acquisition part further acquires the number of communication ports used for communication by each piece of equipment connected to the in-vehicle network, and the control profile acquisition part further acquires a control profile having a total number of ports used for communication smaller than the sum of the acquired number of communication ports used for communication by each piece of equipment.

[Mode 6]

The network control apparatus preferably according to Mode 4 or 5, wherein the vehicle state acquisition part further acquires the power consumption of a communication port used for communication by each piece of equipment connected to the in-vehicle network, and the control profile acquisition part further acquires a control profile having a total power consumption of a port used for communication smaller than the sum of the acquired power consumption of a communication port used for communication by each piece of equipment.

[Mode 7]

The network control apparatus preferably according to any one of Modes 1 to 6 further comprising a vehicle state transition information holding part that holds vehicle state transition information stating a vehicle state and another vehicle state to which the vehicle state may transition in the future, wherein the control profile acquisition part acquires a control profile on the basis of the acquired vehicle state and the held vehicle state transition information.

[Mode 8]

The network control apparatus preferably according to any one of Modes 1 to 7 further comprising a clocking part that outputs a signal at a constant cycle, wherein the control part further performs control according to the signal outputted by the clocking part.

[Mode 9]

As the method relating to the second aspect.

[Mode 10]

As the program relating to the third aspect.

Further, the disclosure of each Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the claims and the figures) and based on the basic technical concept thereof. Further, it is possible to variously combine or select (or deselect if necessary) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the claims and the figures, and the technical concept of the present invention. Particularly, any numerical values or ranges disclosed herein should be interpreted that any intermediate or lower values or subranges falling within the disclosed ranges are also disclosed even without specific recital thereof. In addition, using some or all of the disclosed elements in each literature cited above as necessary in combination with the elements described herein as part of the disclosure of the present invention in accordance with the object of the present invention shall be considered to be included in (or belong to) the disclosed elements of the present application.

01: network control apparatus
02: vehicle state acquisition part
03: control profile acquisition part
04: control part
05: communication port #1
06: communication port #2

07: clocking part
08: vehicle state transition information holding part
101: CPU (Central Processing Unit)
102: memory
103: input/output interface
104: NIC (Network Interface Card)
105: internal bus
106: timer

What is claimed is:

1. A network control apparatus comprising:
at least a processor; and
a memory in circuit communication with the processor,
wherein the processor is configured to execute program instructions stored in the memory to implement:
a vehicle state acquisition part that acquires a state of a vehicle;
a control profile acquisition part that acquires a control profile, according to the acquired state of the vehicle, from one or more control profiles including settings for controlling equipment connected to an in-vehicle network; and
a control part that controls equipment within the in-vehicle network on the basis of the acquired control profile, wherein
the vehicle state acquisition part further acquires a state of a communication port of equipment connected to the in-vehicle network,
the control profile acquisition part further acquires the control profile on the basis of the acquired state of the communication port, and
the control part further controls the communication port of equipment connected to the in-vehicle network on the basis of the acquired control profile.

2. The network control apparatus according to claim 1, wherein
the vehicle state acquisition part further acquires power consumption of each piece of equipment connected to the in-vehicle network, and
the control profile acquisition part further acquires the control profile on the basis of a sum of the acquired power consumption of each piece of the equipment.

3. The network control apparatus according to claim 1, wherein
the control profile acquisition part further acquires a control profile grouping equipment connected to the in-vehicle network, and
the control part controls each group on the basis of the control profile grouping equipment.

4. The network control apparatus according to claim 1, wherein
the vehicle state acquisition part further acquires the number of communication ports used for communication by each piece of equipment connected to the in-vehicle network, and
the control profile acquisition part further acquires the control profile having a total number of ports used for communication smaller than a sum of the acquired number of communication ports used for communication by each piece of equipment.

5. The network control apparatus according to claim 1, wherein
the vehicle state acquisition part further acquires power consumption of a communication port used for communication by each piece of equipment connected to the in-vehicle network, and
the control profile acquisition part further acquires the control profile having a total power consumption of a port used for communication smaller than a sum of the acquired power consumption of a communication port used for communication by each piece of equipment.

6. The network control apparatus according to claim 1 further comprising a vehicle state transition information holding part that holds vehicle state transition information stating a vehicle state and another vehicle state to which the vehicle state can transition in the future, wherein
the control profile acquisition part acquires the control profile on the basis of the acquired vehicle state and the held vehicle state transition information.

7. The network control apparatus according to claim 1 further comprising a clocking part that outputs a signal at a constant cycle, wherein
the control part further performs control according to the signal outputted by the clocking part.

8. A network control method performed by a computer and comprising:
acquiring a state of a vehicle;
acquiring a control profile, according to the acquired state of the vehicle, from one or more control profiles including settings for controlling equipment connected to an in-vehicle network;
controlling equipment within the in-vehicle network on the basis of the acquired control profile;
acquiring a state of a communication port of equipment connected to the in-vehicle network;
acquiring the control profile on the basis of the acquired state of the communication port; and
controlling a communication port of equipment connected to the in-vehicle network on the basis of the acquired control profile.

9. A non-transitory computer-readable recording medium storing a program executable by a computer to perform processing comprising:
acquiring a state of a vehicle;
acquiring a control profile, according to the acquired state of the vehicle, from one or more control profiles including settings for controlling equipment connected to an in-vehicle network;
controlling equipment within the in-vehicle network on the basis of the acquired control profile;
acquiring a state of a communication port of equipment connected to the in-vehicle network;
acquiring the control profile on the basis of the acquired state of the communication port; and
controlling a communication port of equipment connected to the in-vehicle network on the basis of the acquired control profile.

* * * * *